(12) United States Patent
Zarek et al.

(10) Patent No.: US 6,353,530 B1
(45) Date of Patent: Mar. 5, 2002

(54) METHOD FOR SUPPORTING A LAPTOP COMPUTER BASE

(75) Inventors: Lynne Zarek, Boise, ID (US); Paul T. Parker, Kingston; John M. Wechkin, Bainbridge Island, both of WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/044,385

(22) Filed: Mar. 18, 1998

(51) Int. Cl.[7] .................................................. G06F 1/16
(52) U.S. Cl. ........................ 361/683; 361/679; 361/686; 108/43; 108/131; 206/320; 248/118; 248/444
(58) Field of Search ................................. 248/118, 444; 108/43, 131; 206/320; 361/683, 679, 686

(56) References Cited

U.S. PATENT DOCUMENTS

| | | | |
|---|---|---|---|
| 2,783,109 A | 2/1957 | Frey | 311/25 |
| 3,662,694 A | * 5/1972 | Mitchell | 108/131 |
| 3,859,930 A | 1/1975 | Sherwin | 108/6 |
| 4,052,944 A | 10/1977 | Jennings | 108/43 |
| 5,029,260 A | 7/1991 | Rollason | |
| 5,081,936 A | 1/1992 | Drieling | |
| 5,263,423 A | 11/1993 | Anderson | 108/43 |
| 5,355,811 A | 10/1994 | Brewer | 108/43 |
| D358,551 S | 5/1995 | Viletto et al. | |
| 5,732,910 A | * 3/1998 | Martin | 248/118 |
| 5,862,933 A | 1/1999 | Neville | 220/17.1 |
| 5,871,094 A | 2/1999 | Leibowitz | 206/320 |
| D406,580 S | 3/1999 | Nien | |
| 5,893,540 A | 4/1999 | Scott | |
| 5,937,765 A | * 8/1999 | Sterling | 108/43 |
| 5,957,595 A | 9/1999 | Chen | |
| 5,971,148 A | * 10/1999 | Jackson | 206/320 |

* cited by examiner

Primary Examiner—Leo P. Picard
Assistant Examiner—Yean-Hsi Chang
(74) Attorney, Agent, or Firm—Perkins Coie LLP

(57) ABSTRACT

A method for supporting a base of a laptop computer on a user's lap. The base may have a lower surface with two concave depressions that extend from a forward edge to a rear edge of the base. The depressions are spaced apart from one another and configured to receive a user's legs to support the weight of the laptop computer. In one embodiment, the depressions have roughness elements or a skid-resistant material. In another embodiment, support members extending outwardly from the base provide extra support for the base and/or further restrict motion of the base relative to the user's legs.

21 Claims, 10 Drawing Sheets

METHOD FOR SUPPORTING A LAPTOP COMPUTER BASE

TECHNICAL FIELD

The present invention is directed toward a method for supporting a laptop computer base on a user's lap.

BACKGROUND OF THE INVENTION

Laptop computers are portable computers that generally operate from either external or portable power sources. Conventional laptop computers typically have a base pivotally connected to a display housing. The base typically includes a primary input device, such as a keyboard, and a secondary input device, such as a computer mouse, roller ball or touch pad. The display housing typically includes a liquid crystal display (LCD) or other type of display. To access the keyboard and the display, a user positions the base on a surface (e.g., the user's lap or a fixed surface) and opens the computer by pivoting the display housing away from the base. To close and easily transport the computer after use, the user pivots the display housing toward the base and secures the housing to the base.

In conventional laptop computers, the base typically has a small, flat lower surface that rests on the user's legs or another surface when the computer is in use. One drawback with such a conventional laptop computer base is that it may be uncomfortable to use. For example, the small lower surface distributes the weight of the laptop computer over a relatively small area of the user's legs. Furthermore, it may be difficult or awkward to support the computer on the user's lap. For example, to adequately support the computer on the user's lap, the user's legs must be squeezed together to provide a platform for the base. Such a leg position is generally uncomfortable and difficult to maintain for long periods of time. Thus, users are likely to shift either the computer or their legs in a manner that disrupts operation of the computer or increases the likelihood that the computer may fall from their laps.

Another drawback with the conventional laptop base is that it is difficult to balance the base on the user's legs. For example, because the laptop base generally contacts only a small portion of the user's legs, the laptop computer may be easily dislodged from the user's lap. Furthermore, because the base is typically made from a hard, smooth plastic, the laptop computer may slide off the user's lap, and damage the computer and/or data stored on the computer. Such a conventional laptop computer may be particularly likely to slide from the user's lap when it is used in airplanes, buses or other cramped and crowded environments where the computer and/or the user may be jostled.

SUMMARY OF THE INVENTION

The present invention is a method for operating a laptop computer. The laptop computer has a base and a display housing coupled to the base. The display housing is movable relative to the base between an opened position and a closed position, and the base has a lower surface with a concave depression therein. In one embodiment, the method comprises engaging at least one of the user's legs with the concave depression and supporting a weight of the base and the laptop computer on the legs of the user. In another embodiment wherein the lower surface has two concave depressions, the method comprises engaging each of the user's legs with one depression and supporting the laptop computer and base on both of the user's legs. The method may further comprise resisting lateral motion of the user's legs relative to the laptop computer. For example, the method may include engaging the user's legs with roughness elements projecting from the lower surface of the laptop computer. In another embodiment, the method may include engaging a skid-resistant material with the user's legs, or engaging a portion of the base with the sides of the user's legs.

In yet another embodiment, the base of the laptop computer includes first and second support members, each of which is connected to the base and movable relative to the base between a stowed position and an unstowed position. Methods associated with this embodiment comprise moving each support member from the stowed position to the unstowed position and engaging each support member with one of the user's legs. For example, in one embodiment, each support member may be pivoted away from the base to the unstowed position. In another embodiment, each support member may be translated outwardly relative to the base to an unstowed position. In still a further embodiment, each support member may have a concave depression and the method may include engaging the user's legs with the depressions to support the base on the user's legs. In still a further embodiment, one of the support members includes an input device, and the method further comprises accessing the input device to transmit a command to the laptop computer. For example, the input device may include a touch-sensitive surface and the act of accessing the input device may include touching the input device with a digit.

DETAILED DESCRIPTION OF THE INVENTION

The present invention is directed toward a method for supporting a laptop computer base on a user's lap. The base may be supported directly on the user's lap by engaging a contoured lower surface of the base with the user's legs. The base may also be supported on the user's lap by extending movable support members outwardly from the base and engaging the user's legs with the support members, allowing the user to maintain a wider leg stance while still supporting the base. Many specific details of certain embodiments of the invention are set forth in the following description and in FIGS. 1–11 to provide a thorough understanding of such embodiments. One skilled in the art, however, will understand that the present invention may have additional embodiments and may be practiced without several of the details described in the following description.

Figure 1:
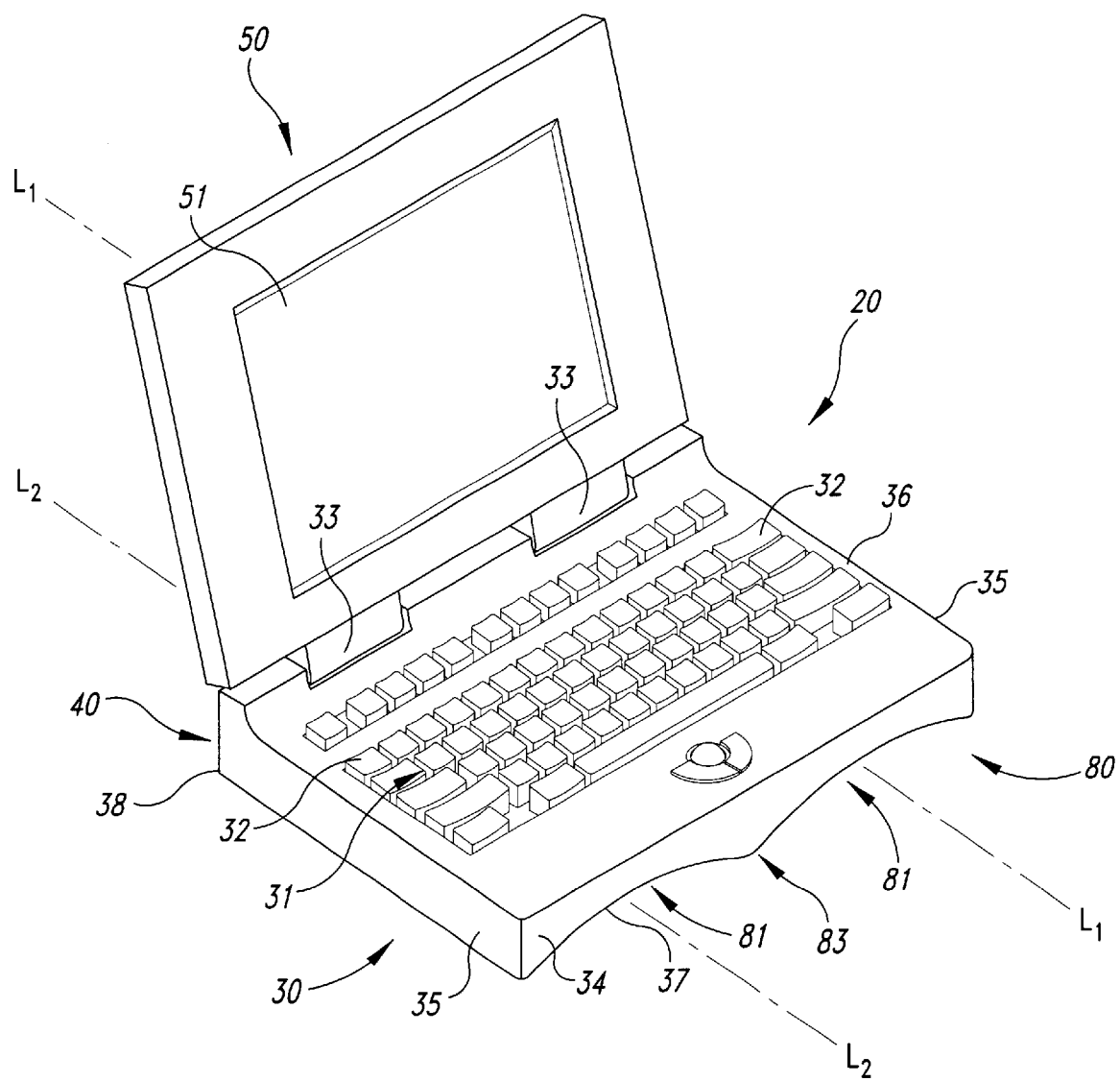
FIG. 1 is a top isometric view of a laptop computer having a base with a contoured lower surface that operates in accordance with an embodiment of the invention.

FIG. 1 is a top isometric view of a laptop computer 20 having a base 30 coupled to a display housing 50 by a plurality of hinges 33. The base 30 may include a primary input device, such as a conventional keyboard 31 having a plurality of input keys 32, and the display housing 50 may include a display 51, such as a conventional liquid crystal display (LCD). When in use, the display housing 50 may be pivoted away from the base 30 to an operating or open configuration (shown in FIG. 1) so that both the display 51 and the keyboard 31 are accessible to a user (not shown). When the computer 20 is not in use, the computer may be folded for transport by pivoting the display housing 50 toward the base 30 and then securing the display housing 50 to the base 30 in a closed configuration.

The base 30 has a forward surface 34 facing the user, a rear surface 40 opposite the forward surface, and side surfaces 35 extending between the forward and rear surfaces. The keyboard 31 projects from an upper surface 36 of the base 30 to be accessible to the user when the laptop computer 20 is in the open configuration. The base 30 further includes a lower surface 80 opposite the upper surface 36 that is contoured to engage the user's legs when the laptop computer 20 is placed on the user's lap for operation.

Figure 2A:
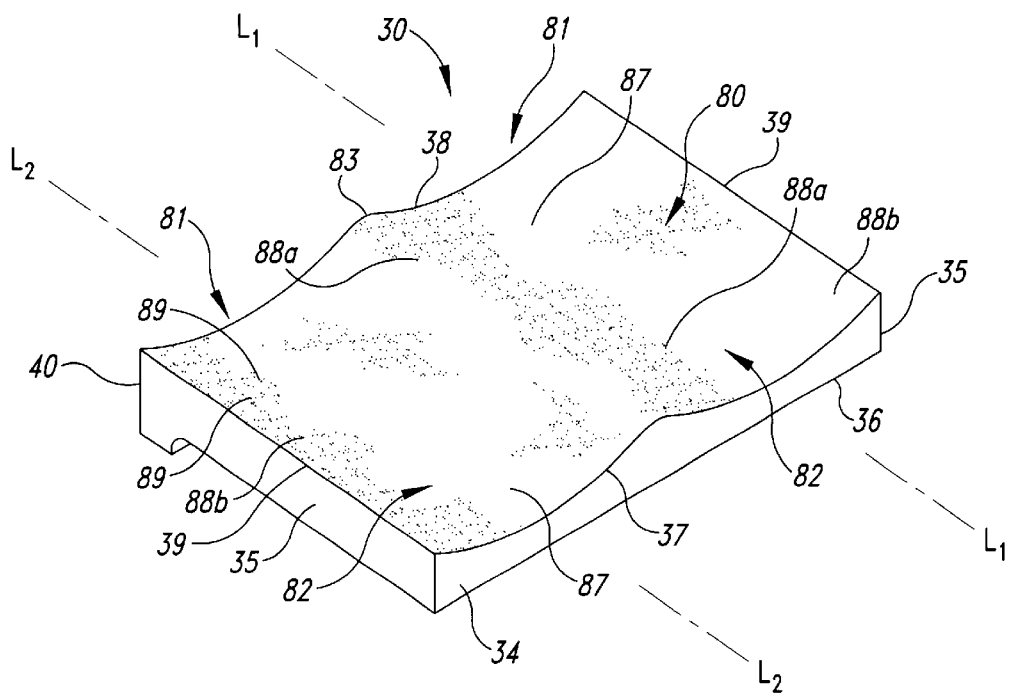
FIG. 2A is a top isometric view of the lower surface of the base shown in FIG. 1.

FIG. 2A is a top isometric view of the lower surface 80 of the base 30 shown in FIG. 1. Referring to FIGS. 1 and 2A, the lower surface 80 is contoured with two elongated depressions or troughs 81 that extend between the forward surface 34 and the rear surface 40 generally along upper leg axes $L_1$—$L_1$ and $L_2$—$L_2$. In this particular embodiment, the depressions 81 extend parallel or approximately parallel to side edges 39 of the lower surface 80, and the depressions 81 each span the lower surface 80 from a forward edge 37 to a rear edge 38 of the lower surface 80. Each depression 81 is generally concave relative to the lower surface 80 and includes a central region 87 between inner and outer side regions 88a and 88b. The central regions 87 and the side regions 88a, 88b are curved to correspond to the curvature of users' legs. The side regions 88a, 88b are thus smoothly contoured with the central regions 87 to define generally concave engaging surfaces 82 shaped to engage both the upper and side surfaces of users' legs. In the embodiment shown in FIG. 2A, the two inner side regions 88a are smoothly contoured with each other to define a ridge 83 between the depressions 81 that is convex relative to the lower surface 80. The ridge 83 is positioned to extend at least partially between a user's legs when the computer 20 is placed on the user's lap. In another embodiment shown in FIG. 2B, the ridge 83 and inner side regions 88a are eliminated from the base 130 such that the lower surface 80 has a single elongated depression 181 extending from the forward edge 37 to the rear edge 38.

Figure 2B:
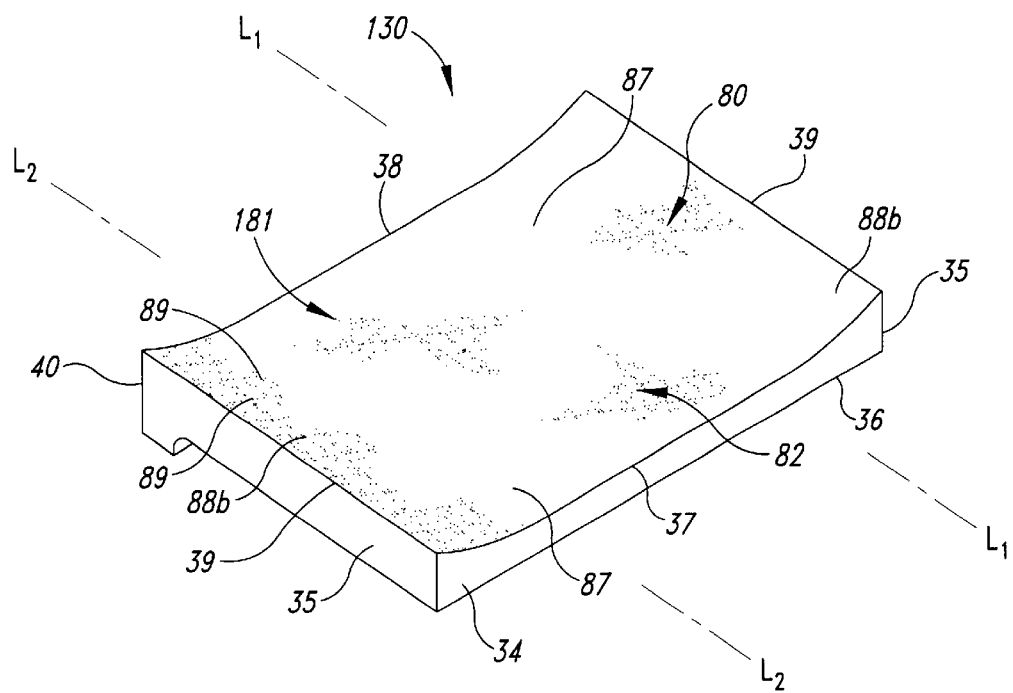
FIG. 2B is a top isometric view of a lower surface of a base that operates in accordance with another embodiment of the invention.
Figure 2C:
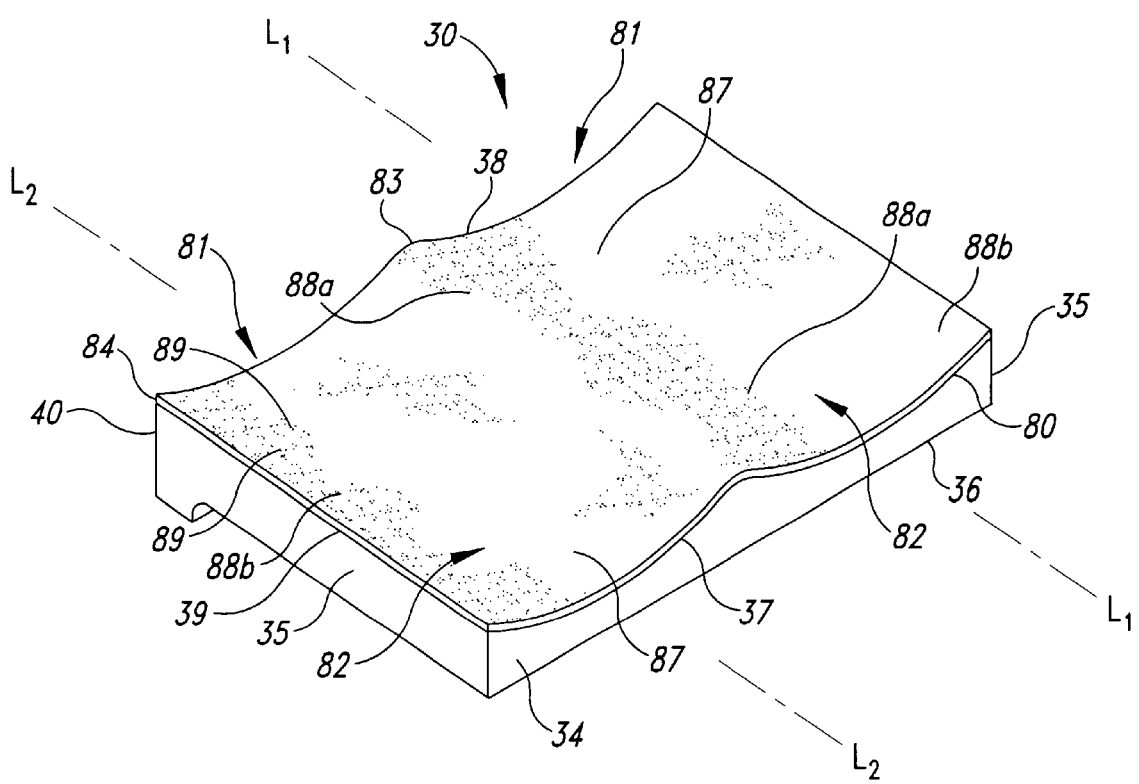
FIG. 2C is a top isometric view of a lower surface of a base that operates in accordance with still another embodiment of the invention.

In the base 30 shown in FIGS. 1 and 2A–2B, the contoured lower surface 80 is shaped to engage both the upper and side surfaces of the user's legs. Accordingly, compared to conventional computer bases with flat lower surfaces, the lower surface 80 distributes the weight of the laptop computer 20 over a greater surface area of the user's legs to make the computer 20 more comfortable to operate. Additionally, because the contoured lower surface 80 shown in FIGS. 1 and 2A–B has side regions 88a and/or 88b shaped to engage the sides of the user's legs, the base 30 resists relative lateral motion between the user's legs and base 30. The contoured lower surface 80, therefore, may reduce the likelihood that the laptop computer 20 will slide around on the user's lap.

As shown in FIGS. 2A–2B, the lower surface 80 may be textured to increase the friction between the base 30 and the user's legs. For example, a plurality of roughness elements 89 may be distributed across the lower surface 80 to further resist relative lateral motion between the base 30 and the user's legs. The roughness elements 89 may be small projections projecting away from the engaging surface 82 and they may be integral with the lower surface 80 of the base 30. In another embodiment, shown in FIG. 2C, the roughness elements 89 are distributed over a separate roughness layer 84 that is separately attached to the lower surface 80. The roughness layer 84 may comprise a resilient, flexible material that conforms to the shape of the lower surface 80, and it may be attached to the lower surface 80 with adhesives or other suitable means. In one aspect of this embodiment, the roughness layer 84 may be composed of a skid-resistant material. For example, the roughness layer 84 may be composed of rubber or any conventional synthetic material having a relatively high friction coefficient.

An advantage of the roughness elements 89 and the skid-resistant roughness layer 84 is that they may further reduce the amount of relative motion between the laptop computer 20 and the user's legs. A further advantage of the roughness layer 84 shown in FIG. 2C, in addition to its skid-resistant qualities, is that a plurality of bases 30 may be manufactured without the roughness elements 89 and the roughness layer 84 may be added to selected bases during a subsequent manufacturing or retrofit process. Accordingly, the base 30 may include the roughness layer 84 as an option for users who prefer the roughness elements 89. Conversely, an advantage of the molded roughness elements 89 shown in FIGS. 2A–2B is that they may be relatively inexpensive to manufacture.

Figure 3:
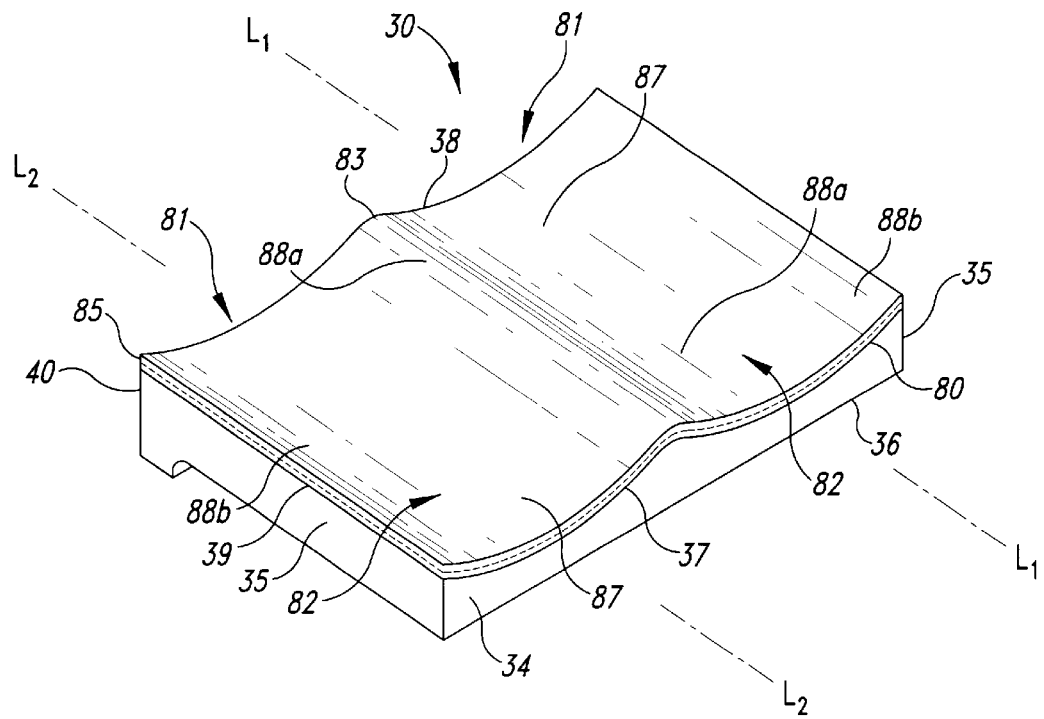
FIG. 3 is a top isometric view of a lower surface of a base that operates in accordance with yet another embodiment of the invention.

FIG. 3 is a top isometric view of the base 30 having a compressible layer 85 attached to the lower surface 80 that operates in accordance with another embodiment of the invention. The compressible layer 85 is resilient and deforms under loads between an uncompressed position (solid lines in FIG. 3) and a compressed position (dashed lines) when the base 30 is placed on the user's lap. Accordingly, the compressible layer 85 may be composed of many commercially available materials, such as a synthetic high-density foam. In a further aspect of this embodiment, the compressible layer 85 may include roughness elements 89 (FIGS. 2A–2C) and/or may have skidresistant characteristics, as discussed above with reference to FIG. 2C.

An advantage of the compressible layer 85 is that it may make the base 30 more comfortable when positioned on the user's lap. A further advantage is that the compressible layer 85 may compress in a non-uniform manner to increase the contact area between the base 30 and the user's legs. For example, when the compressible layer 85 is in the compressed position, it may compress more in the central regions 87 than the side regions 88a and 88b because the central regions 87 are generally normal to the load path between the base 30 and the user's legs. As the central regions 87 of the compressible layer 85 compress, the side regions 88a and 88b may be drawn into closer contact with the user's legs, distributing the weight of the base 30 more evenly over the surfaces of the user's legs and further inhibiting relative lateral motion between the base 30 and the user's legs.

Figure 4A:
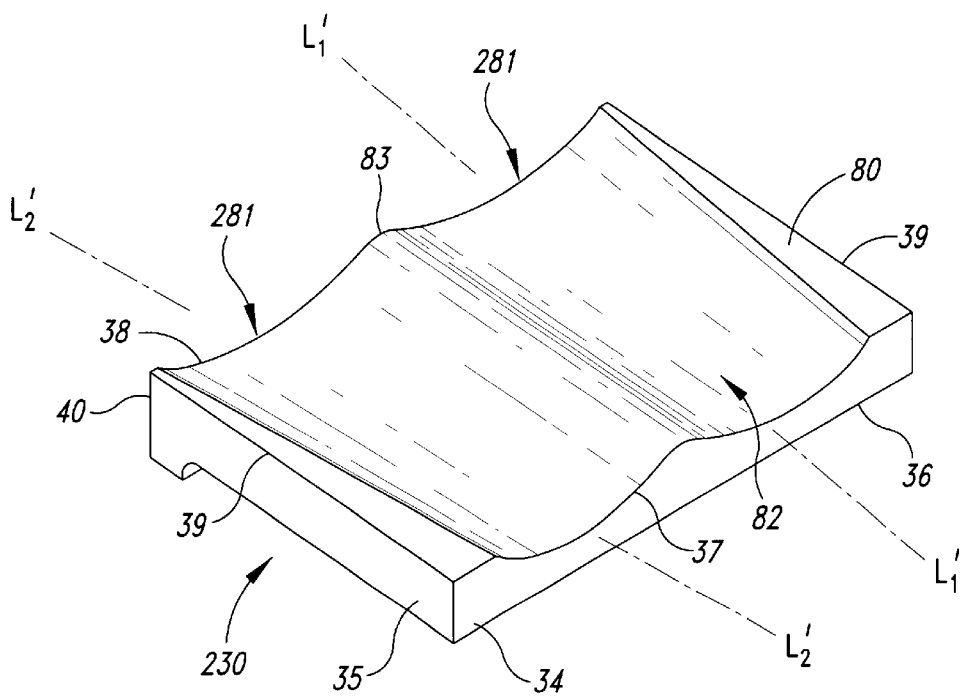
FIG. 4A is a top isometric view of a lower surface of a base having diverging depressions that operate in accordance with another embodiment of the invention.
Figure 4B:
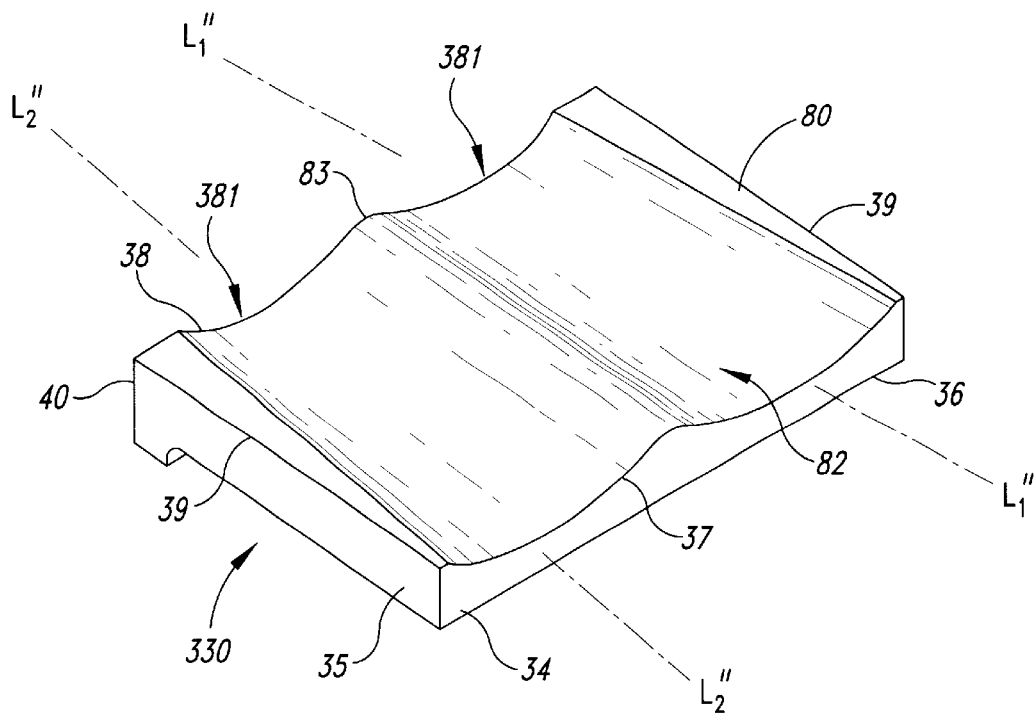
FIG. 4B is a top isometric view of a lower surface of a base having converging depressions that operate in accordance with still another embodiment of the invention.

FIG. 4A is a top isometric view of the lower surface 80 of a base 230 that operates in accordance with another embodiment of the invention. As shown in FIG. 4A, the depressions 281 in the lower surface 80 extend generally along leg axes $L'_1$—$L'_1$ and $L'_2$—$L'_2$ to diverge apart from one another as they extend from the forward surface 34 to the rear surface 40 of the base 230. The diverging depressions 281 may more comfortably fit on the laps of users who prefer to separate their legs slightly while supporting the base 230. In another embodiment, shown in FIG. 4B, the depressions 381 extend along leg axes $L''_1$—$L''_1$ and $L''_2$—$L''_2$ to converge toward one another as they extend from the forward surface 34 to the rear surface 40 of the base 330. The base 330 shown in FIG. 4B may accordingly be more comfortable for users who prefer to keep their legs tightly together when supporting the base 330 on their laps.

Figure 5:
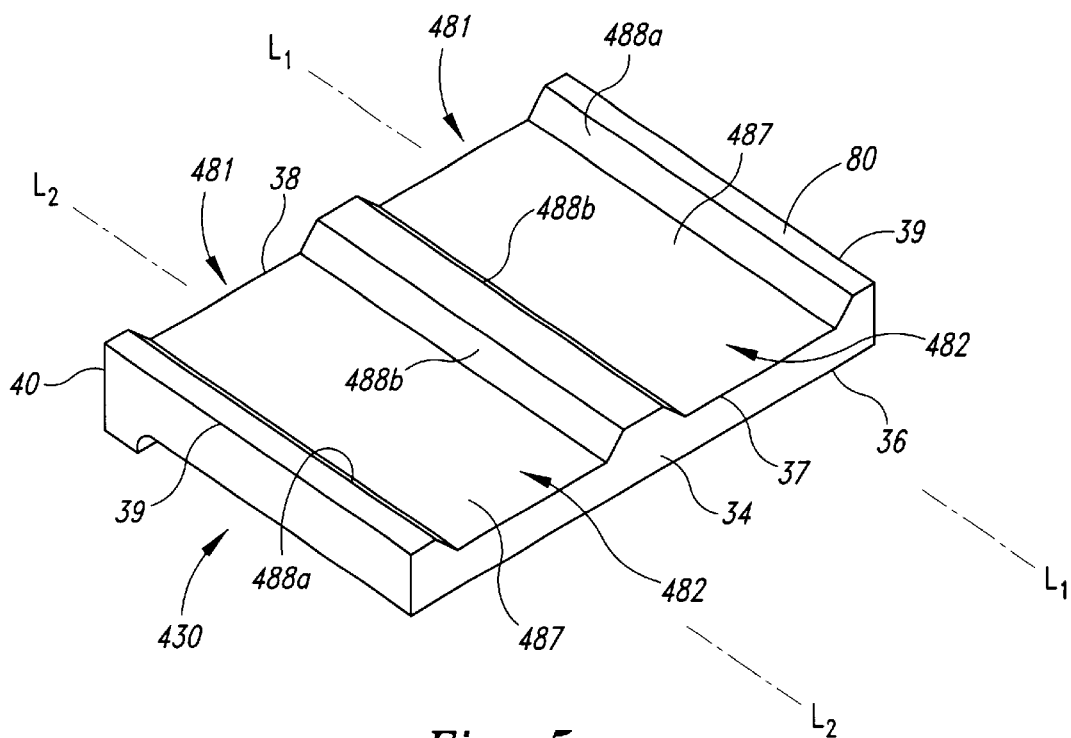
FIG. 5 is a top isometric view of a lower surface of a base having depressions with flat surfaces that operate in accordance with yet another embodiment of the invention.

FIG. 5 is a top isometric view of the lower surface 80 of a base 430 having depressions 481 with flat engaging surfaces 482 that operate in accordance with another embodiment of the invention. Accordingly, both the central regions 487 and side regions 488a and 488b of the engaging surfaces 482 are flat. In another embodiment (not shown), the central regions 487 are flat and the side regions 488a, 488b are curved, and in still another embodiment, the central regions are curved and the side regions 488a, 488b are flat. As shown in FIG. 5, the flat outer side regions 488a of the engaging surfaces 482 may be more nearly vertical than the curved outer regions 88a shown in FIGS. 1–4B. Accordingly, an advantage of the flat outer side regions 488a is that they may be more nearly perpendicular to the sides of the user's legs and, as a result, may more effectively resist relative lateral motion between the user's legs and the base 430. Conversely, an advantage of the curved engaging surfaces 82 shown in FIGS. 1–4B is that they may be more comfortable because they evenly distribute the weight of the base 30 over the user's legs.

Figure 6:
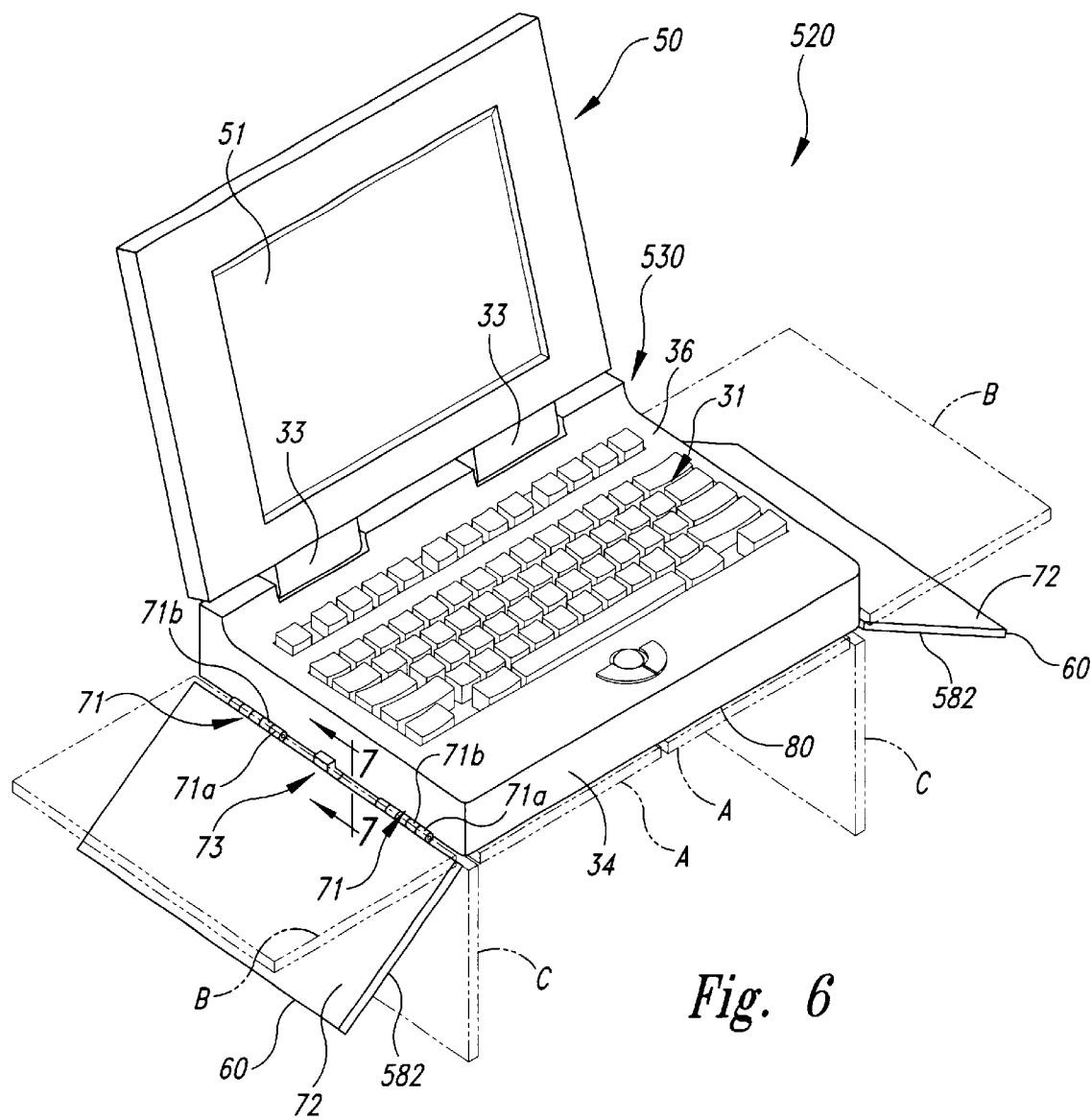
FIG. 6 is a top isometric view of a laptop computer having pivotable support members coupled to the base that operate in accordance with still another embodiment of the invention.

FIG. 6 is a top isometric view of another laptop computer 520 having a base 530 with support members 60 movably attached to the base 530 to support the base 530 on the user's lap. In one embodiment, the support members 60 are flat panels having a generally flat upper surface 72 and a generally flat engaging surface 582 opposite the upper surface 72. In another embodiment described in greater detail below with reference to FIG. 10, the engaging surface 582 of each support member 60 may be contoured. In the embodiment shown in FIG. 6, the support members 60 are pivotally attached to the base 530 with hinges 71 at the lower surface 80 of the base 530 to pivot relative to the base 530 between a stowed position A (shown in dashed lines) and a variety of unstowed positions.

When each support member 60 is in the stowed position A, the engaging surfaces 582 are folded against the lower surface 80 of the base 530. Accordingly, each of the support members 60 may have a width that is approximately one-half or less than one-half a width of the base 530 so that the support members do not overlap each other when in the stowed position A. In another embodiment, discussed in greater detail below with reference to FIG. 8, the support members 60 may overlap each other when in the stowed position A.

To rest the computer 520 on a user's lap, the support members 60 may be moved from the stowed position A to a first unstowed position B (shown by horizontal dashed lines) such that the support members 60 extend horizontally away from the base 530. When the support members 60 are in the first unstowed position B, the engaging surfaces 582 are approximately coplanar with the lower surface 80 of the base 530 so that the support members 60 and base 530 form a relatively large, flat platform for supporting the laptop computer 520 on the user's lap. Unlike conventional laptop bases, therefore, the base 530 allows the user to still support the computer 520 on the user's lap while the user's legs are in a more ergonomic position. For example, the support members 60 continue to support the laptop computer 520 on the user's lap even when the user has a relatively wide leg stance such that the user's legs are not positioned directly beneath the keyboard 31 and the display 51.

The support members 60 may also be positioned in a second unstowed position C (shown by vertical dashed lines). When the support members 60 are in the second unstowed position C, the user's legs may press against the engaging surfaces 582. An advantage of the support members 60 when in the second unstowed position C is that they may make the laptop computer 520 more comfortable to operate because users may not need to squeeze their legs together. For example, with the support members 60 in the second unstowed position C, users may relax their legs against the engaging surfaces 582 because the support members 60 keep their legs centered beneath the base 530 to support the laptop computer 520. This may be particularly advantageous when the laptop computer 520 is used in cramped environments where users wish to keep their legs relatively close together but also wish to be more relaxed while supporting the computer 520. Yet another advantage of the support members 60 when in the second unstowed position C is that they may engage a substantial portion of the sides of the user's legs and may accordingly resist relative lateral motion between the laptop computer 520 and the user's legs, reducing the likelihood that the laptop computer will fall from the user's lap.

Figure 7:
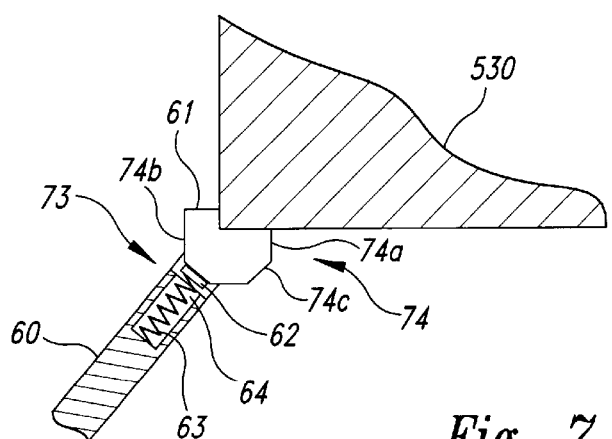
FIG. 7 is a cross-sectional view of a portion of a support member and the base taken substantially along line 7—7 of FIG. 6.

In addition to the unstowed positions B and C discussed above, the support members 60 may be positioned in any number of other unstowed positions, such as the position indicated in solid lines in FIG. 6. To hold the support members 60 relative to the base 530 in any of the stowed or unstowed positions, a locking device 73 may releasably fix the support members 60 to the base 530. FIG. 7 is a cross-sectional view of a portion of the base 530 and one support member 60 taken substantially along line 7—7 of FIG. 6 showing the details of one embodiment of the locking device 73. The locking device 73 may include a cam member 61 attached to the base 530, and a follower member 62 coupled to the support member 60 in an aperture 64. The follower member 62 is biased against the cam member 61 with a spring 63 or other type of biasing device. The cam member 61 may include a plurality of facets 74 that securely engage the follower member 62 when the support member 60 is in a selected position. For example, when the support member 60 is in the stowed position A, the follower member 62 engages facet 74a. Similarly, when the support member 60 is in the first unstowed position B or the second unstowed position C, the follower member 62 engages facet 74b or 74c, respectively.

In other embodiments, the positions of the cam member 61 and the cam follower 62 are interchanged so that the cam member 61 is attached to the support member 60 and the cam follower is attached to the base 530. In still further embodiments, other means may be used to secure the support member 60 at selected positions relative to the base 530. In one such embodiment, frictional forces in the hinges 71 are sufficient to secure the support member 60 in the selected position. For example, as shown in FIG. 6, the friction between one hinge component 71a (connected to the support member 60) and another hinge component 71b (connected to the base 530) is sufficient to maintain the support member in any of the stowed or unstowed positions discussed above. At the same time, the frictional forces between the hinge components 71a, 71b can be overcome to move the support members 60 relative to the base 30 when necessary.

Figure 8:
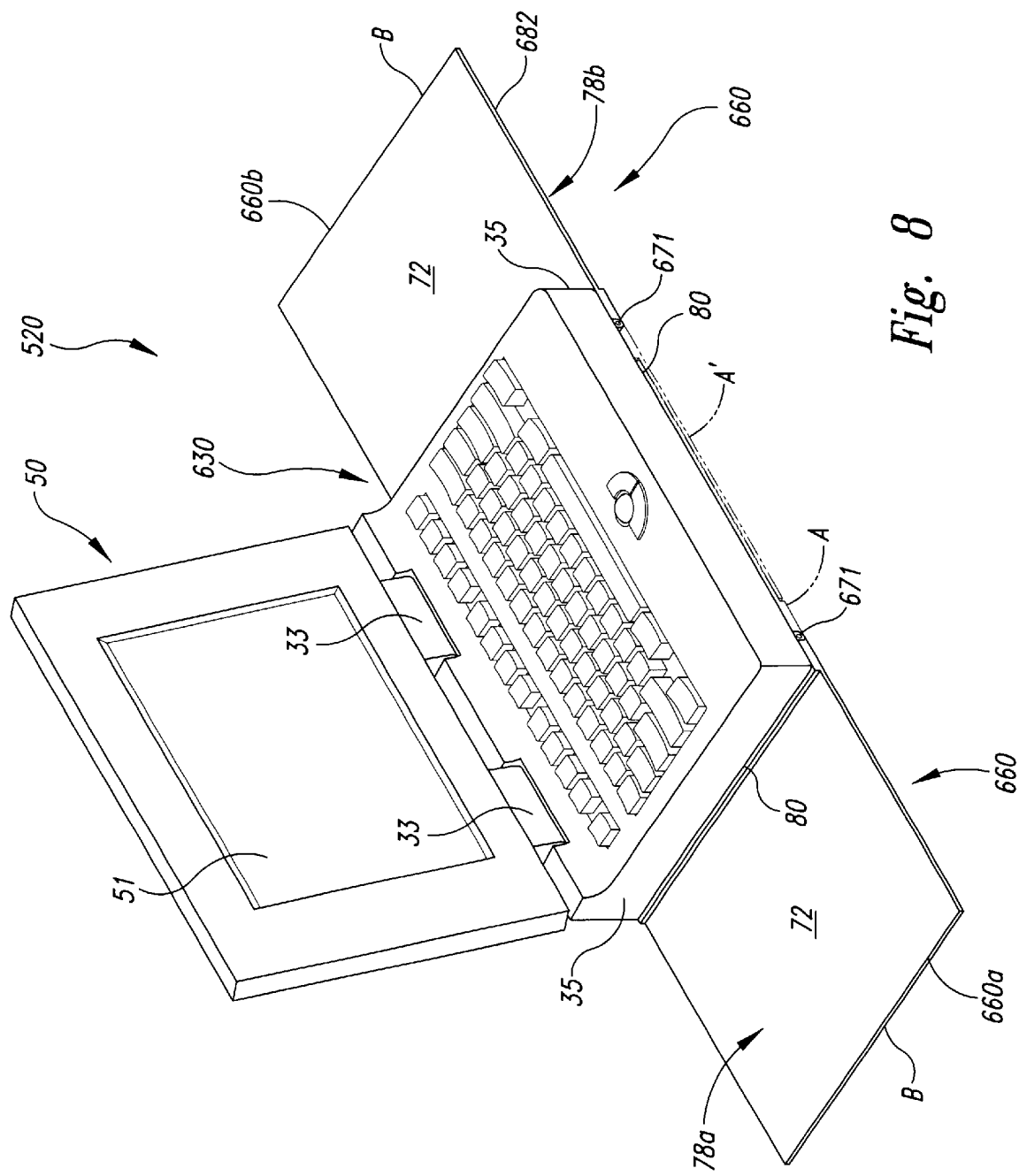
FIG. 8 is a top isometric view of a laptop computer having pivotable support members that operate in accordance with another embodiment of the invention.

In other embodiments, the locking device 73 may include clamps, wing nuts, or other securing means (not shown) known to those skilled in the art. For example, as shown in FIG. 8, the lower surface 80 of the base 630 secures the support members 660 in the first unstowed position B (shown in solid lines) because the support members 660 are pivotally coupled to the base 630 with hinges 671 positioned inward of the sides 35. More specifically, when the support members 660 are in the first unstowed position B, the upper surfaces 72 of the support members 660 firmly engage the lower surface 80 of the base 630 to prevent the support members 660 from rotating upwardly beyond the first unstowed position B. An advantage of the locking arrangement shown in FIG. 8 is that it is simple and relatively inexpensive to construct. An advantage of the locking device 73 shown in FIGS. 6 and 7, however, is that it may be configured to secure the support members 560 in more than one unstowed position.

Returning to FIG. 8, the support members 660 overlap each other in the stowed position. Accordingly, the support members 660 include a left support member 660a having a recessed portion 78a in its upper surface 72, and a right support member 660b having a recessed portion 78b in its engaging surface 682. When the support members 660 are stowed, the left support member 660a is folded to its stowed position A and then the right support member 660b is folded to its stowed position A' so that the recessed portion 78b of the right support member 660b nests against the recessed portion 78a of the left support member 660a. An advantage of the overlapping support members 660 is that they may have a width that is greater than half the width of the base 630 to form a larger, more stable support platform for the base 630. This advantage may be particularly important where, as shown in FIG. 8, the support members 660 are coupled to the base inward of the side surfaces 35. However, in another embodiment, the overlapping support members 660 may be advantageously coupled to the ends of the base 630 adjacent to the side surfaces 35 (as is generally shown in FIG. 6) to provide the base with a very large, stable support platform.

Figure 9:
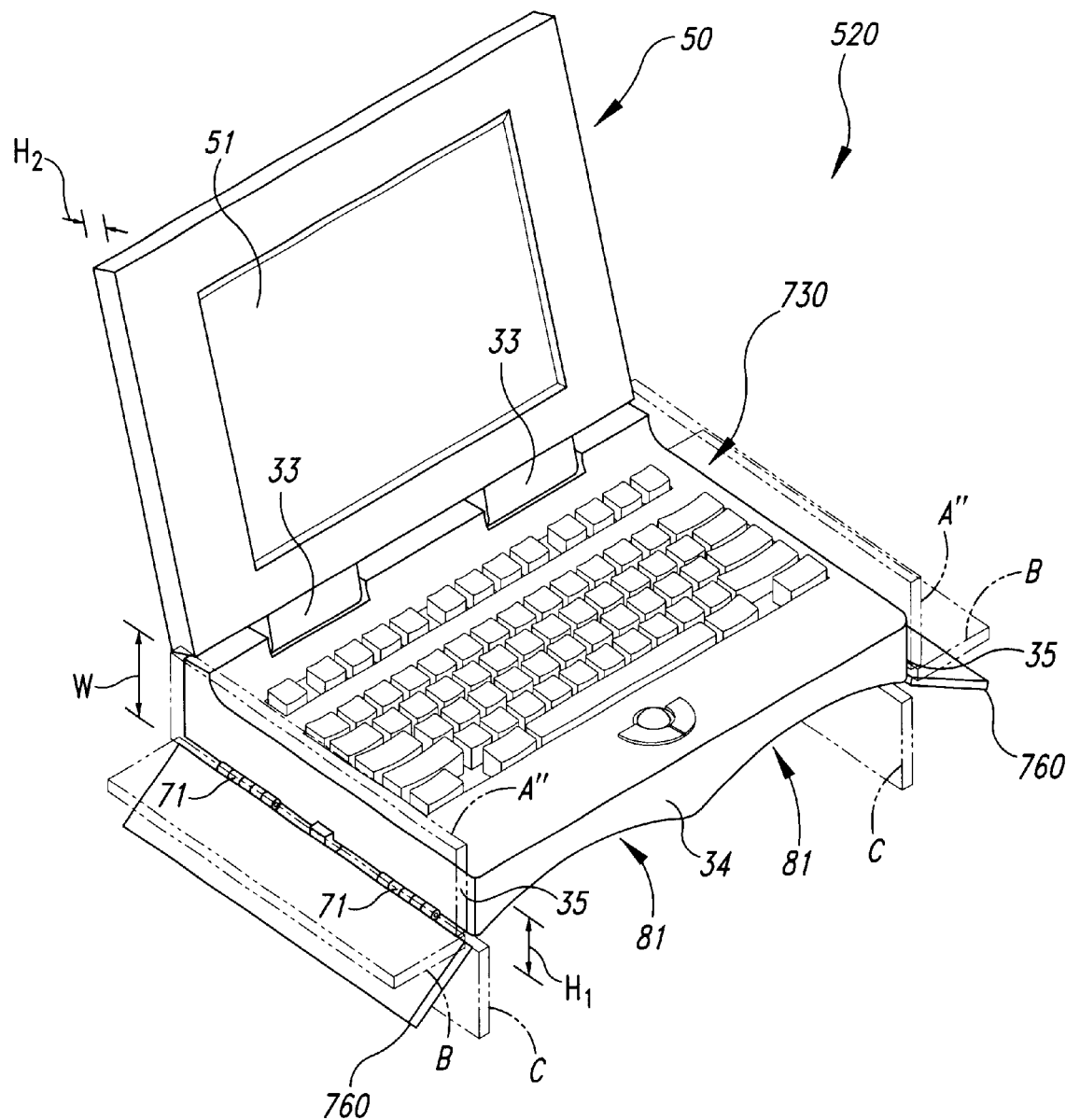
FIG. 9 is a top isometric view of a laptop computer having pivotable support members that operate in accordance with still another embodiment of the invention.

FIG. 9 is a top isometric view of the laptop computer 520 having the base 730 and a plurality of support members 760 pivotally attached to the sides 35 of the base 730 in accordance with another embodiment of the invention. Each of the support members 760 may be folded upwardly against a corresponding side surface 35 of the base 730 when in a stowed position A" (shown in dashed lines). The support members 760 may accordingly have a width W that is less than or equal to the combined heights $H_1$ of the base 730 and $H_2$ of the display housing 50 when the display housing 50 is folded down against the base 730 in the closed configuration. Each support member 760 may be moved to first and second unstowed positions B and C in substantially the same manner as discussed above with reference to FIG. 6.

As shown in FIG. 9, the lower surface 80 of the base 730 may include depressions 81 that engage the user's legs in substantially the same manner as discussed above with reference to FIGS. 1–4B. When the support members 760 are moved to the second unstowed position C, the support members 760 and the depressions 81 together engage a relatively large portion of both the upper and side surfaces of the user's legs to distribute the weight of the laptop computer 520 relatively uniformly over the user's legs. In addition, when the support members 760 are in the second unstowed position C, they engage the sides of the user's legs to inhibit relative lateral motion between the laptop computer 520 and the user's legs. Alternatively, the user may position the support members 60 in the first unstowed position B allowing the user to have a wider leg stance and still support the base 730, as discussed above with reference to FIG. 6.

In addition to the contoured lower surface 80 shown in FIG. 9 in combination with the upwardly folding support members 760, other embodiments may use other types of support members. For example, the base 630 may have a contoured lower surface 80 and the support members 60 that fold against or proximate to the lower surface in a manner generally similar to that shown in FIG. 6.

Figure 10:
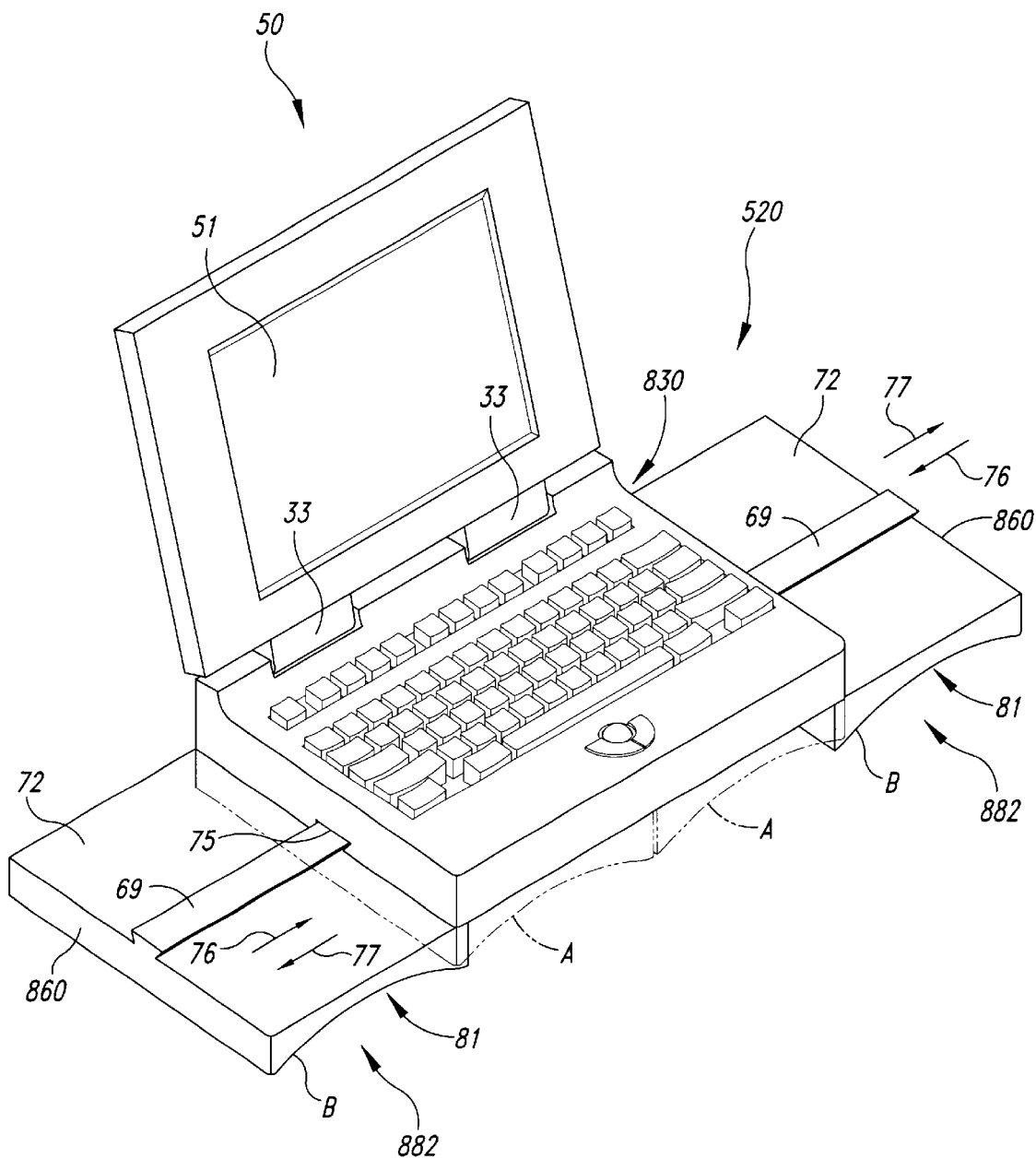
FIG. 10 is a top isometric view of a laptop computer having slidable support members that operate in accordance with yet another embodiment of the invention.

FIG. 10 is a top isometric view of the laptop computer 520 having a base 830 with support members 860 that slide relative to the base 830 in accordance with another embodiment of the invention. As shown in FIG. 10, each support member 860 has a guide rail 69 extending along its upper surface 72. The base 830 accordingly may have a corresponding channel 75 configured to receive the guide rails 69 and allow the guide rails to slide with respect to the base 830 (arrows 76 and 77). A user, therefore, may move the support members 860 from the stowed position A (shown in dashed lines) to the unstowed position B (shown in solid lines), or to any intermediate position. In one embodiment, the guide rails 69 fit snugly within the channel 75 such that the friction between the guide rails 69 and the channel 75 is sufficient to secure the support members 860 in a variety of selected positions. In other embodiments, other securing means may be used to releasably secure the support members 860 in the selected positions.

As shown in FIG. 10, each support member 860 may have a contoured engaging surface 882 with a depression 81 configured in a manner similar to the depressions discussed above with reference to FIGS. 1–4B. In operation, the laptop computer 520 may be placed on the user's lap with the support members 860 in the stowed position to operate as discussed above with reference to FIGS. 1–4B. Alternatively, the user may move the support members 860 outwardly away from the base 830 to support the laptop computer 520 with a wider leg stance. An advantage of the support members 860 shown in FIG. 10 is that they may be placed in any number of intermediate positions between the stowed position A and the fully extended unstowed position B. Accordingly, the laptop computer 520 may be more versatile and easier to use because it may be configured to suit the preferences of a wide variety of users and/or the variable preferences of a single user.

Figure 11:
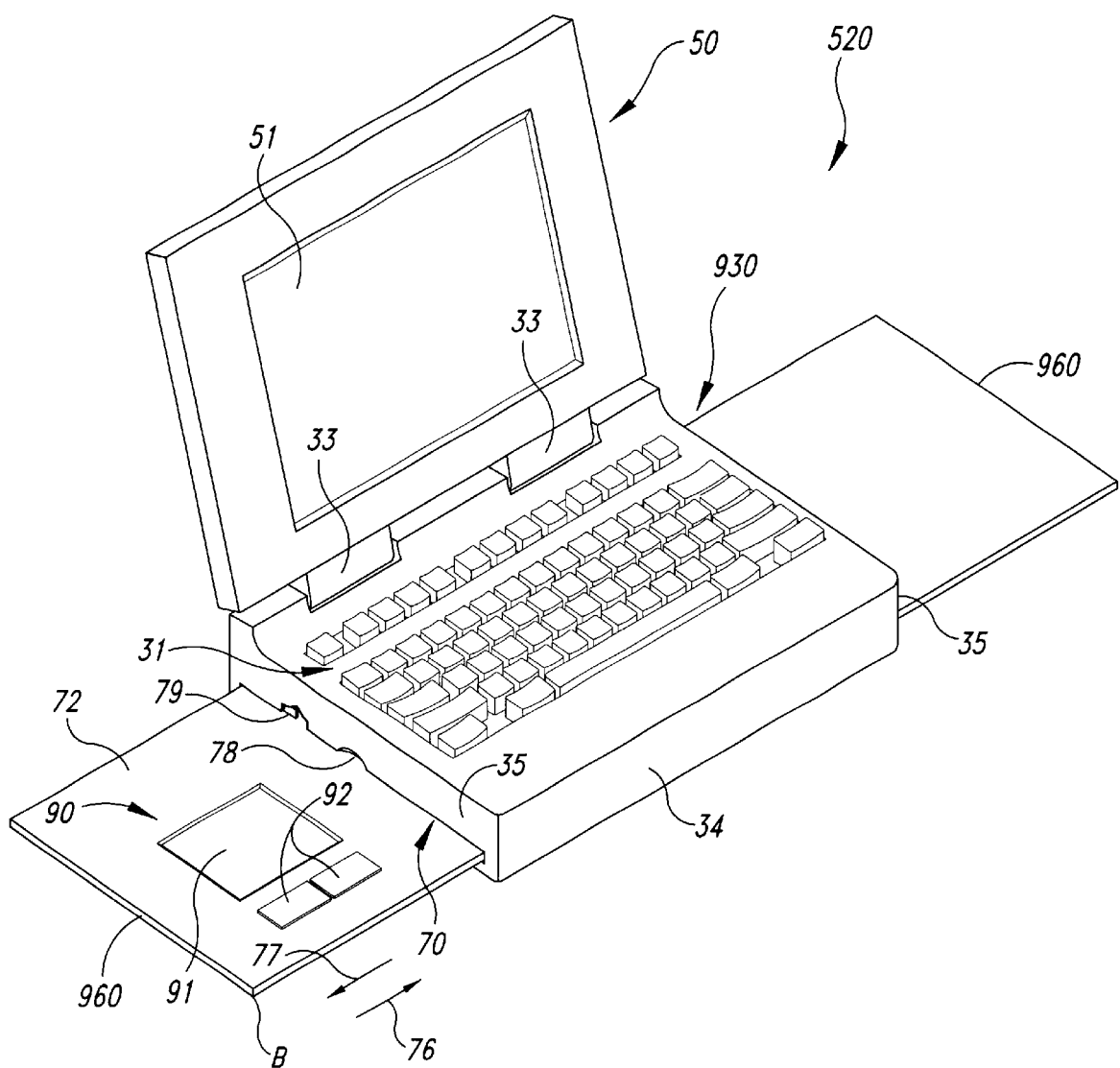
FIG. 11 is a partially cut away top isometric view of a laptop computer having slidable support members and a secondary input device that operate in accordance with still another embodiment of the invention.

FIG. 11 is a top isometric view of a laptop computer 520 having support members 960 that are slidably received in slots 70 in the side surfaces 35 of the base 930. Each support member 960 may be moved out of the corresponding slot 70 (indicated by arrow 77) to the unstowed position B, or into the slot 70 (indicated by arrow 76) to the stowed position (not shown). A stop 79 may project from the upper surface 72 of each support member 960 to engage an inner face of the side surface 35 when the support member 960 is in the unstowed position B for preventing the support member 960 from being completely withdrawn from the slot 70. Each side surface 35 of the base 930 may include a finger aperture 78 that allows the user to easily grip each support member 960 when the support member is in the stowed position for pulling the support member from the stowed position to the unstowed position B.

As shown in FIG. 11, the support member 960 may include a secondary input device 90 in the upper surface 72. The secondary input device 90 may include a touch pad 91 and switches 92, a roller ball (not shown), or other types of devices that transmit input commands to the laptop computer 520. The secondary input device 90 may accordingly be coupled to the laptop computer 520 with a cable (not shown) or other communication means. The secondary input device 90 is accordingly accessible when the support member 960 is in the unstowed position, but it is inaccessible when the support member 960 is in the stowed position. An advantage of the support member 960 having the secondary input device 90 is that the secondary input device is spaced apart from the keyboard 31. A further advantage of the support member 960 and the base 830 shown in FIG. 11 is that the secondary input device 90 is protected from incidental contact and other hazards when the support member 960 is in the stowed position.

In other embodiments (not shown) the secondary input device 90 may be positioned in the upper surface 72 of other support members. For example, the secondary input device 90 may be positioned in the upper surface 72 of the support member 860 shown in FIG. 10, or in the upper surface of any of the support members shown in FIGS. 6–9. An advantage of the input device 90 when positioned in the support member 960 shown in FIG. 11, as compared with the support member 860 shown in FIG. 10, is that the support member 960 has more surface area for the input device because it does not have a guide rail 69. An advantage of the input device 90 when positioned in the support member 960 shown in FIG. 11, as compared with the support members shown in FIGS. 6–9, is that the input device 90 is protected within the base 930 when the support member 960 is in the stowed position.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for restricting motion of a laptop computer relative to legs of a user, the laptop computer having a base, a display housing, a first support member attached to a first edge of the base, a second support member attached to a second edge of the base, each support member being movable relative to the base between a stowed position and an unstowed position, the method comprising:

moving the first and second support members outwardly away from the base from the stowed positions to the unstowed positions;

positioning the first support member against one of the legs of the user, the first support member having an engaging surface positioned against the one leg of the user and an upper surface opposite the engaging surface, the upper surface having an input device operatively coupled to the laptop computer;

accessing the input device to transmit commands to the laptop computer; and positioning the second support member against another of the legs of the user.

2. The method of claim 1, further comprising supporting at least part of a weight of the laptop computer on the first and second support members.

3. The method of claim 1 wherein the act of moving the first and second support members includes pivoting the first and second support members relative to the base.

4. The method of claim 1 wherein the act of moving the first and second support members includes sliding the first and second support members outwardly relative to the base.

5. The method of claim 1 wherein the act of moving the first and second support members includes securing at least one of the first and second support members in the unstowed position.

6. The method of claim 5 wherein the act of securing at least one of the first and second support members includes biasing a follower member connected to one of the support member and the base into engagement with a cam member connected to the other of the support member and the base.

7. The method of claim 1 further comprising:

engaging the one leg of the user with a first concave depression in a lower surface of the first support member; and engaging the other leg of the user with a second concave depression in a lower surface of the second support member.

8. A method for restricting motion of a laptop computer relative to legs of a user, the laptop computer having a base, a display housing, a first support member attached to a first edge of the base, a second support member attached to a second edge of the base, each support member being movable relative to the base between a stowed position and an unstowed position, the method comprising:

moving the first and second support members outwardly away from the base from the stowed positions to the unstowed positions;

positioning the first support member against one of the legs of the user, the first support member having an engaging surface positioned against the one leg of the user and an upper surface opposite the engaging surface, the upper surface having an input device with a touch sensitive surface operatively coupled to the laptop computer;

accessing the input device by touching the input device with a digit to transmit commands to the laptop computer; and positioning the second support member against another of the legs of the user.

9. The method of claim 8, further comprising supporting at least part of a weight of the laptop computer on the first and second support members.

10. The method of claim 8 wherein the act of moving the first and second support members includes pivoting the first and second support members relative to the base.

11. The method of claim 8 wherein the act of moving the first and second support members includes sliding the first and second support members outwardly relative to the base.

12. The method of claim 8 wherein the act of moving the first and second support members includes securing at least one of the first and second support members in the unstowed position.

13. The method of claim 12 wherein the act of securing at least one of the first and second support members includes biasing a follower member connected to one of the support member and the base into engagement with a cam member connected to the other of the support member and the base.

14. The method of claim 8, further comprising:

engaging the one leg of the user with a first concave depression in a lower surface of the first support member; and engaging the other leg of the user with a second concave depression in a lower surface of the second support member.

15. A method for restricting motion of a laptop computer relative to legs of a user, the laptop computer having a base, a display housing, a first support member attached to a first edge of the base, a second support member attached to a second edge of the base, each support member being movable relative to the base between a stowed position and an unstowed position, the method comprising:

moving the first and second support members outwardly away from the base from the stowed positions to the unstowed positions;

positioning the first support member against one of the legs of the user, the first support member having an engaging surface positioned against the one leg of the user and an upper surface opposite the engaging surface, the upper surface being sized and shaped to support a computer mouse thereon;

translating the computer mouse on the upper surface of the first support member; and positioning the second support member against another of the legs of the user.

16. The method of claim 15, further comprising supporting at least part of a weight of the laptop computer on the first and second support members.

17. The method of claim 15 wherein the act of moving the first and second support members includes pivoting the first and second support members relative to the base.

18. The method of claim 15 wherein the act of moving the first and second support members includes sliding the first and second support members outwardly relative to the base.

19. The method of claim 15 wherein the act of moving the first and second support members includes securing at least one of the first and second support members in the unstowed position.

20. The method of claim 19 wherein the act of securing at least one of the first and second support members includes biasing a follower member connected to one of the support member and the base into engagement with a cam member connected to the other of the support member and the base.

21. The method of claim 15, further comprising:

engaging the one leg of the user with a first concave depression in a lower surface of the first support member; and engaging the other leg of the user with a second concave depression in a lower surface of the second support member.

* * * * *